United States Patent Office 3,287,221
Patented Nov. 22, 1966

3,287,221
THERAPEUTIC UTILIZATION OF 17α-METHYL-Δ²-5α-ANDROSTENE-11β,17β-DIOL
Georges Muller, Nogent-sur-Marne, and André Poittevin, Les Lilas, France, assignors to Roussel-Uclaf, Paris, France, a corporation of France
No Drawing. Filed July 30, 1964, Ser. No. 386,432
Claims priority, application France, Aug. 5, 1963, 943,787
9 Claims. (Cl. 167—74)

The present invention relates to a novel 17α-methyl steroid, the 17α-methyl-Δ²-5α-androstene-11β,17β-diol of the formula:

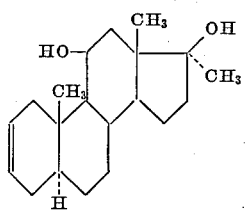

The invention also relates to the process of producing the 17α-methyl steroid, its intermediates and its therapeutic utilization.

The novel compound, subject of the invention, possesses interesting, pharmacological properties. In particular, it possesses an important anabolic action while being practically deprived of an androgenic effect.

Numerous anabolic agents are already known, but these have the disadvantage of having an androgenic action. It has been found that 17α-methyl-Δ²-5α-androstene-11β, 17β-diol, subject of the invention does not possess androgenic properties while having an excellent anabolic effect.

An object of the present invention is the production of a 17α-methyl steroid of the formula

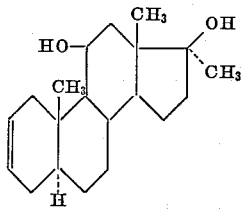

Another object of the invention is the development of a process for the production of a 17α-methyl steroid of the formula

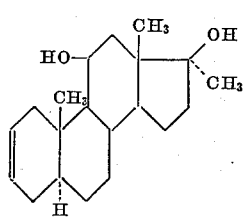

which comprises the steps of reacting 17α-methyl-5α-androstane-3β,11β,17β-triol with an organic hydrocarbon sulfonic acid chloride of the formula

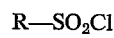

R—SO₂Cl wherein R represents an organic hydrocarbon group having from 1 to 10 carbon atoms, in an organic solvent, subjecting the resulting compound of the formula

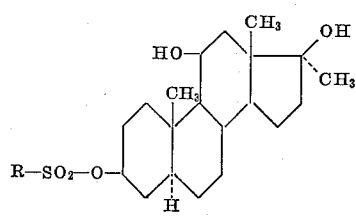

wherein R has the above-assigned meaning, to the action of an alkaline agent in a solvent at elevated temperatures, and recovering said 17α-methyl steroid.

A further object of the invention is the production of intermediates, particularly a sulfonic acid ester of the formula

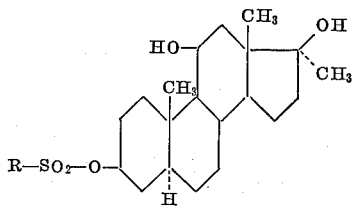

wherein R represents an organic hydrocarbon group having from 1 to 10 carbon atoms.

A yet further object of the invention is the production of a therapeutic composition consisting of a minor amount of a 17α-methyl steroid of the formula

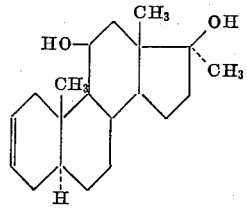

and a major amount of an inert pharmaceutically-acceptable excipient.

A still further object of the invention is the development of a method for the treatment of anabolic deficiencies in warm-blooded animals which comprises administrating to the warm-blooded animal a daily dose of from 7 γ/kg. to 600 γ/kg. of a 17α-methyl steroid of the formula

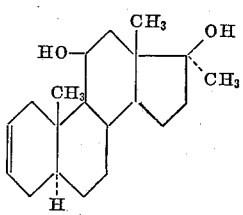

These and other objects of the invention will become more apparent as the description thereof proceeds.

The process for the preparation of 17α-methyl-Δ²-5α-androstene-11β,17β-diol, which is also a subject of the invention, is characterized essentially in that an organic hydrocarbon sulfonic acid chloride is reacted with 17α-methyl-5α-androstane-3β,11β,17β-triol. The 3β-sulfonate ester correspondingly formed is subjected to the action of an alkaline agent, and the desired 17α-methyl-Δ²-5α-androstene-11β,17β-diol is isolated.

The reaction of the sulfonic acid chloride is conducted in an organic solvent, preferably in a solvent capable of neutralizing the hydrochloric acid produced, such as pyridine or other tertiary amines. The organic hydrocarbon sulfonic acid chloride is preferably of the formula $$R-SO_2-Cl$$

wherein R represents an organic hydrocarbon group having from 1 to 10 carbon atoms, such as tosyl chloride (p-toluene sulfonic acid chloride) or mesyl chloride (methane sulfonic acid chloride). The reaction is conducted at temperatures from about −15° C. to about room temperature, preferably from about −5° C. to about +5° C.

The alkaline agent, used for the introduction of the 2-3 double bond is preferably selected from the group consisting of alkali metal hydroxides and alkali metal carbonates. The reaction is conducted in a solvent at elevated temperatures, especially at reflux temperatures. An alkali metal hydroxide in an aqueous media can be utilized but preferably an alkali metal carbonate is used and more precisely lithium carbonate in dimethylformamide is preferred.

The following examples are illustrative of the invention. It is to be understood that other expedients known to those skilled in the art may be employed.

EXAMPLE I.—PREPARATION OF 17α-METHYL-Δ²-5α-ANDROSTENE-11β,17β-DIOL

*Step A: Preparation of 2β-tosyloxy-17α-methyl-5α-androstane-11β,17β-diol.*—5 g. of 17α-methyl-5α-androstane-3β,11β,17β-triol (described in U.S. Patent No. 2,861,087), and 25 cc. of pyridine were introduced into a balloon flask under agitation and in a stream of nitrogen at room temperature. The mixture was cooled to −2° C., then 4.3 g. of tosyl chloride were added. The mixture was agitated for one hour at 0° C. under a stream of nitrogen and thereafter allowed to stand overnight at 0° C. while continuously agitating. Then the mixture was poured over a mixture of ice and water and allowed to stand at rest for a period of three hours. Next, the mixture was filtered. The precipitate was washed with water and dissolved in methylene chloride. The organic phase was decanted, dried over magnesium sulfate and distilled to dryness under vacuum. The residue was recrystallized from methanol by heating and cooling. The crystalline precipitate was filtered, then washed with methanol and dried. 6.10 g. of 3β-tosyloxy-17α-methyl-5α-androstane-11β,17β-diol were thus obtained in the form of a product crystallized in needles. This product is very soluble in chloroform, soluble in acetone, slightly soluble in alcohol and insoluble in water, dilute aqueous acids and ether, has a melting point of 120° C. to 125° C. and a specific rotation $[\alpha]_D^{20}=+1°$ (c.=0.5% in chloroform).

This compound is not described in the literature.

*Step B: Preparation of 17α-methyl-Δ²-5α-androstene-11β,17β-diol.*—0.50 g. of lithium bromide were dissolved, in a balloon flask, in 2.5 cc. of dimethylformamide under agitation at room temperature. 0.50 g. of 3β-tosyloxy-17α-methyl-5α-androstane-11β,17β-diol were added, followed by 0.25 g. of lithium carbonate. The mixture was heated to reflux for a period of thirty minutes. Then the mixture was cooled to room temperature. 25 cc. of water and 2 cc. of acetic acid were added. The precipitate formed was filtered, washed with water and dried at a temperature of 100° C. 0.285 g. of 17α-methyl-Δ²-5α-androstene-11β,17β-diol were thus obtained, having a melting point of 180° C. to 182° C. (being a yield of 89%). The product was purified by recrystallization from petroleum ether. 17α-methyl-Δ²-5α-androstene-11β,17β-diol was thus obtained in the form of a product crystallized in colorless prisms. This product is very soluble in alcohol, acetone, benzene and chloroform, soluble in ether and insoluble in water, melts at 184° C. (Kofler block), and has a specific rotation $[\alpha]_D^{20}=+47°$ ±1.5° (c.=0.9% in ethanol).

The I.R. spectra shows:

Absence of carbonyl band
Presence of a hydroxyl group
A band towards 1,650 cm.$^{-1}$ attributable to a—C=C— double bond The NMR spectra conforms to the presence of a double bond in the 2–3 position.

*Analysis.*—$C_{20}H_{32}O_2$; molecular weight=304.46. Calculated: C, 78.89%; H, 10.59%. Found: C, 78.8%; H, 10.4.

This compound is not described in the literature,

As it has been indicated above, 17α-methyl-Δ²-5α-androstene-11β,17β-diol possesses interesting pharmacological properties. In particular, it possesses an important anabolic action while being practically devoid of an androgenic effect.

It may be used for the treatment in warm-blooded animals of protidic anabolism, asthenia, thinness and osteoporosis.

17α-methyl-Δ²-5α-androstene-11β,17β-diol can be administered by oral, transcutaneous or rectal administration.

It can be prepared in the form of injectable solutions or suspensions, made up in ampoules or multiple dose phials; in form of tablets, coated tablets, drinkable solutes and suppositories.

The useful dosology is controlled between 70γ/kg. and 150γ/kg. per dose and 70γ/kg. to 600γ/kg. per day in warm-blooded animals as a function of the method of administration.

The pharmaceutical forms such as injectable solutions or suspensions, tablets, coated tablets, drinkable solutes or suppositories, are prepared according to the usual processes.

EXAMPLE II.—PHARMACOLOGICAL STUDY OF 17α-METHYL-Δ²-5α-ANDROSTENE-11β,17β-DIOL

*Determination of the androgenic and anabolic activity*

These tests were conducted according to the Hershberger technique (Proc. Soc. Exp. Biol. Med. 1953, 83, 175), slightly modified. This consisted in a daily administration of the compound under study to male rats, castrated at an age of 3½ weeks. The rats were treated, starting the day after the castration, for a period of ten days, and the animals were sacrificed on the eleventh day, 22 to 26 hours after the last administration. An autopsy was performed on the animals at the time of their death, and the organs of interest were dissected and weighed, particularly the levator muscle of the anus (levator ani) for the purpose of studying the anabolic action, and the ventral prostate gland and the seminal vesicles for the purpose of studying the simultaneous androgenic effect.

17α-methyl-Δ²-5α-androstene-11β,17β-diol, utilized in suspension in water containing carboxymethyl cellulose, was administered orally at doses of 0.214 mg., 1.070 mg. and 5 mg. per rat and per day. The results obtained were compiled in Table I hereafter. For purpose of comparison, the results obtained with 17α-methyl-testosterone, 17α-methyl-19-nor-testosterone and 17a-ethyl-19-nor-testosterone are also presented.

TABLE I

| Treatment | Daily Dose | Seminal vesicles, mg. | Ventral prostate, mg. | Fresh levator ani, mg. | Lf[1] |
|---|---|---|---|---|---|
| Control | 0 | 5.3 | 11.6 | 18.6 | 0.219 |
| 17α-methyltestosterone | 1 mg | 16.5 | 52.3 | 25.8 | 0.303 |
|  | 5 mg | 51.7 | 81.7 | 37.2 | 0.443 |
| 17α-methyl-19-nortestosterone. | 1 mg | 18.2 | 28.1 | 32.7 | 0.365 |
|  | 5 mg | 36.8 | 74.7 | 48.1 | 0.631 |
| 17α-ethyl-19-nortestosterone. | 222γ | 4.2 | 7.3 | 20.7 | 0.274 |
|  | 1.111 mg | 4.9 | 10.8 | 20.5 | 0.278 |
|  | 5.555 mg | 15.6 | 39.4 | 32.8 | 0.422 |
| 17α-methyl-Δ²-5α-androstene-11β,17β-diol. | 214γ | 7.9 | 15.8 | 22.4 | 0.275 |
|  | 1.070 mg | 7.8 | 19.7 | 31.4 | 0.360 |
|  | 5 mg | 19.5 | 32.6 | 40.5 | 0.457 |

[1] Lf=ratio of the weight of the fresh levator ani×10³ to the body weight.

These results show that 17α-methyl-Δ²-5α-androstene-11β,17β-diol presents a clear anabolic action, equal or even slightly superior to those of 17α-methyl-testosterone and of 17α-ethyl-19-nor-testosterone, all while presenting only a very weak androgenic effect, quite similar to that of 17α-ethyl-19-nor-testosterone and distinctly lower than that of 17α-methyl-testosterone. By comparison with 17α - methyl - 19 - nor - testosterone, the compound 17α-methyl-Δ²-5α-androstene-11β,17β-diol, subject of the invention, shows a lower anabolic effect at a dose of 5 mg., but it shows, on the other hand, a clearly less androgenic effect.

Determination of the toxicity

17α-methyl-Δ²-5α-androstene-11β,17β-diol, utilized in an aqueous suspension, was administered orally, to two groups of 10 female mice each of the Rockland strain, having an average weight of 20 g., at doses of 50 mg./kg. and 100 mg./kg. respectively, in a volume of 0.4 cc. per mouse weighing 20 g.

No sign of intoxication or mortality was observed in the mice kept under observation over a period of 8 days.

17α-methyl-Δ²-5α - androstene - 11β,17β - diol is, consequently, well tolerated by the mice in the acute toxicity test, at a dose of 100 mg./kg., orally administered.

The preceding examples are illustrative of the invention. It is to be understood however that other expedients may be employed without departing from the spirit of the invention or the scope of the appended claims.

We claim:

1. A 17α-methyl steroid of the formula

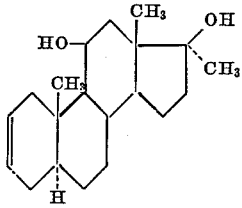

2. A process for the production of a 17α-methyl steroid of the formula

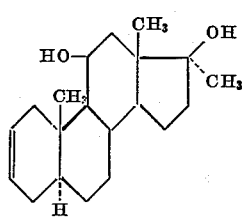

which comprises the steps of reacting 17α-methyl-5α-androstane-3β,11β,17β-triol with an organic hydrocarbon sulfonic acid chloride of the formula $$R-SO_2Cl$$

wherein R represents an organic hydrocarbon group having from 1 to 10 carbon atoms, in an organic solvent, subjecting the resulting compound of the formula

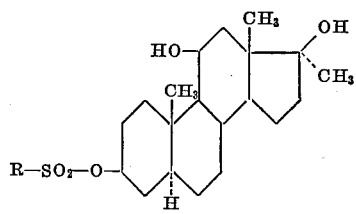

wherein R has the above-assigned meaning, to the action of an alkaline agent in a solvent at elevated temperatures, and recovering said 17α-methyl steroid.

3. The process of claim 2 wherein said organic hydrocarbon sulfonic acid chloride in an organic solvent is tosyl chloride in pyridine.

4. The process of claim 2 wherein said organic hydrocarbon sulfonic acid chloride in an organic solvent is mesyl chloride in pyridine.

5. The process of claim 2 wherein said alkaline agent is a member selected from the group consisting of alkali metal hydroxide and alkali metal carbonate.

6. A process for the production of 17α-methyl-Δ²-5α-androstene-11β,17β-diol which comprises the steps of reacting 17α-methyl-5α-androstane-3β,11β,17β-triol with tosyl chloride in pyridine, subjecting the 3β-tosyloxy-17α-methyl-5α-androstane-11β,17β-diol to the action of lithium carbonate in dimethylformamide at reflux temperature and recovering said 17α-methyl-Δ²-5α-androstene-11β,17β-diol.

7. A sulfonic acid ester of the formula

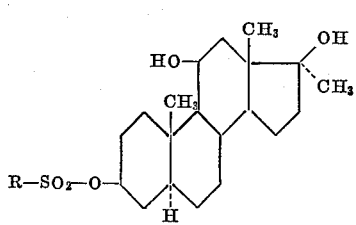

wherein R represents an organic hydrocarbon having from 1 to 10 carbon atoms.

8. 3β-tosyloxy-17α-methyl-5α-androstane-11β,17β-diol.

9. A method for the treatment of anabolic deficiencies in warm-blooded animals which comprises administering to the warm-blooded animal a daily dose of from 70 γ/kg. to 600 γ/kg. of a 17α-methyl steroid of the formula
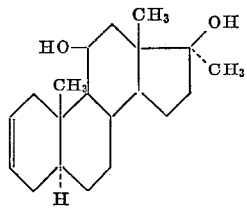
References Cited by the Examiner
Berkoz et al.: Journal Org. Chem., vol. 28 (August), 1963, page 1977.
Harnik: Journal Org. Chem., vol. 28 (1963) pages 3387–3389.
LEWIS GOTTS, *Primary Examiner.*
ELBERT L. ROBERTS, *Examiner.*